United States Patent Office 3,276,957
Patented Oct. 4, 1966

3,276,957
THERAPEUTIC COMPOSITIONS AND METHODS FOR TREATING CORONARY AFFECTIONS
Boris Rybak, Caen, Calvados, France, assignor to Laboratoires Houde, Paris, France, a corporation of France
No Drawing. Filed Feb. 20, 1964, Ser. No. 346,105
Claims priority, application France, Mar. 1, 1963, 926,477
10 Claims. (Cl. 167—65)

The object of the present invention is to provide a therapeutic composition for treating coronary affections and angina pectoris comprising as active principle 2′,3′-isopropylidene adenosine mixed with a therapeutically administrable vehicle.

2′,3′-isopropylidene adenosine is a chemical compound known as an intermediate synthesis product but it has not been described as being of utility in human therapeutics.

It has the following empirical formula: $C_{13}H_{17}N_5O_4$ and the following structural formula:

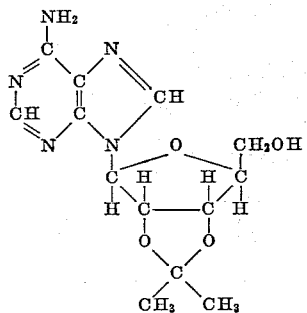

Its molecular weight is 307.3.

It can be prepared by the condensation of acetone and adenosine in the presence of a dehydrating agent, which can be zinc chloride, in accordance with the methods described by:

(1) P. A. Levene and R. S. Tipson, J. Biol. Chem., 1937, 121, 131
(2) J. Baddiley and A. R. Todd, J. Chem. Soc., 1947, 648
(3) F. Weygand and O. Trauth, Chem. Ber., 1951, 84, 633

Some authors prefer utilizing p-toluene sulphonic acid as the dehydrating agent, namely:

(4) Z. A. Shabarova, L. G. Andronova, M. Bezdek and A. A. Prokoviev, Dokl. Ak. Nauk URSS, 1960, 130, 346
(5) A. Hampton, J. Amer. Chem. Soc., 1961, 83, 3640.

The melting point varies somewhat from one author to another, as can be seen hereinafter:

|  | ° C. |
|---|---|
| (1) | 200–204 |
| (2) and (4) | 220 |
| (3) | 216 |
| (5) | 217–218 |

The results obtained for the rotary power of 2′,3′-isopropylidene adenosine are:

in an aqueous solution $[\alpha]_D^{18} = -65.0°$ (c.=1) (2)

in an aqueous solution $[\alpha]_D^{25} = -63.9°$ (1)

in solution in pyridine: $[\alpha]_D^{26} = -99.8°$ (1)

in solution of 0.1 N oxalic acid: $[\alpha]_D^{25} = -52.5°$ (1)

in solution in 0.1 N hydrochloric acid:

$[\alpha]_D^{25} = -54.0°$ shifting to $-48°$ (1)

V. M. Clark, A. R. Todd and J. Zussman, J. Chem. Soc., 1951, 2952, have found for the ultraviolet absorption the values of $\lambda_{max} = 259$ m$\mu$; $\epsilon_{max} = 14{,}800$.

The toxicological study of the active principle of the composition of the invention shows that 2′,3′-isopropylidene adenosine has practically no toxicity. Indeed, if doses up to 20 g./kg. are injected in the mouse by the intravenous route there is observed immediately after the injection dyspnea which lasts about ¾ hour, due to the amount of the doses injected, but the day after the animal resumes its normal state.

There will now be given by way of examples some results obtained in the pharmacological study of the active principle:

As concerns the isolated heart of the rabbit perfused with the Tyrode solution 2′,3′-isopropylidene adenosine added to the perfusion liquid at the concentration of 1 mg./ml. increases the coronary flow to the extent of about 30%. This action lasts 5–9 minutes. At the concentration of 3 mg., the coronary flow increases by 60% (this coronary-dilating action lasts considerably longer than with any known products).

For any concentration which has an action on the coronary flow, the product acts neither on the rhythm nor on the amplitude of the cardiac contractions.

When injected in the marginal vein of the ear of the rabbit anesthetized with urethane at the concentration of 2 mg./ml., the product sometimes results in a drop in the carotid pressure during the period of the injection but this depression is immediately followed by a slight but sustained slow rise in arterial pressure.

2′,3′-isopropylidene adenosine is of utility in human therapeutics in particular for treating coronary affections and in particular angina pectoris.

The composition can be administered at doses varying between 15 and 250 mg. of active principle every 24 hours by the intravenous, intramuscular, sublingual, oral or rectal routes.

As concerns these different modes of administration, the active principle is associated with vehicles appropriate for the corresponding pharmaceutical forms.

Some preparations of the composition of the invention will now be given by way of examples to which the invention is not intended to be limited.

Injectable ampoules: Mg.
    2′,3′-isopropylidene adenosine _____ 50
    Sodium chloride _____ 17
    Distilled water to make up, 3 ml.

Sublingual tablets:
    2′,3′-isopropylidene adenosine _____ 15
    Excipient (starch, saccharose, gum-arabic, talc and magnesium stearate) to make up a finished tablet of, 0.15 g.

Glutinized pills:
    2′,3′-isopropylidene adenosine _____ 60
    Excipient (talc, starch, lactose and magnesium stearate) to make up a finished core of 0.20 g.
    Coating (gum lacquer varnish, colophane, gluten, starch, talc, sugar and colouring matter) to make up a finished glutinized pill of, 0.40 g.

Suppositories:
    2′,3′-isopropylidene adenosine _____ 30
    Semi-synthetic glycerides to make up a finished suppository of, 2 g.

Having now described my invention what I claim as new and desire to secure by Letters Patent is:

1. Therapeutic composition in unit dosage form containing from 15–60 mg. of the active principle in each dosage of said composition for treating coronary affections and angina pectoris comprising as said active principle 2',3'-isopropylidene adenosine having the formula:

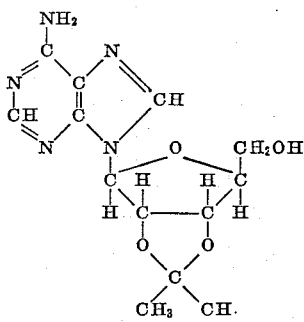

in admixture with a therapeutically administrable vehicle selected from the group consisting of injectable saline, pharmaceutically acceptable tableting excipients and glycerides employed in suppositories.

2. A composition as claimed in claim 1, in the form of an injectable solution of sodium chloride in distilled water.

3. A composition as claimed in claim 1, wherein each unitary dose of injectable solution contains 50 mg. of active principle.

4. A composition as claimed in claim 1, in the form of sublingual tablets containing a mixture of starch, saccharose, gum-arabic, talc and magnesium stearate as excipients.

5. A composition as claimed in claim 4, wherein each tablet contains 15 mg. of active principle.

6. A composition as claimed in claim 1, in the form of glutinized pills having a mixture of talc, starch, lactose, and magnesium stearate as the excipient and coated with gum lacquer varnish, colophane, gluten, starch, talc, sugar and coloring matter.

7. A composition as claimed in claim 6, wherein each pill contains 60 mg. of active principle.

8. A composition as claimed in claim 1, in the form of suppositories in which semi-synthetic glycerides are employed as the vehicle.

9. A composition as claimed in claim 8, wherein each suppository contains 30 mg. of active principle.

10. A process for treating coronary affections and angina pectoris, comprising administering to patients suffering from said affections 2',3'-isopropylidene adenosine having the formula:

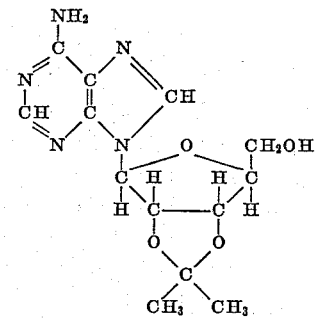

wherein 15–250 mg. of 2',3'-isopropylidene adenosine are administered to said patients during each 24-hour period.

References Cited by the Examiner

Chemical Abstracts: Volume 54, p. 11040h (1960).
Chemical Abstracts: Volume 55, p. 17639d (1961).
Chemical Abstracts: Volume 55, p. 20937h (1961).

JULIAN S. LEVITT, *Primary Examiner.*

M. J. COHEN, *Assistant Examiner.*